United States Patent [19]

Kuragano

[11] 4,018,704
[45] Apr. 19, 1977

[54] METHOD FOR DESORPTION OF METHYL BROMIDE

[75] Inventor: Morimasa Kuragano, Yokohama, Japan

[73] Assignee: Mitsui Toatsu Chemicals, Incorporated, Tokyo, Japan

[22] Filed: Nov. 10, 1975

[21] Appl. No.: 630,748

[30] Foreign Application Priority Data

Nov. 14, 1974 Japan .............................. 49-130499

[52] U.S. Cl. .......................... 252/411 R; 260/652 P
[51] Int. Cl.² .................... B01D 15/06; C07C 21/14
[58] Field of Search ............. 252/411 R; 260/652 P

[56] References Cited

UNITED STATES PATENTS

| | | | |
|---|---|---|---|
| 1,784,536 | 12/1930 | Pantenburg | 252/411 R |
| 2,359,660 | 10/1944 | Martin et al. | 252/411 R X |
| 2,562,334 | 7/1951 | Roberts | 252/411 R X |
| 3,274,104 | 9/1966 | Hamilton | 252/411 R X |

FOREIGN PATENTS OR APPLICATIONS

| | | |
|---|---|---|
| 49-22683 | 6/1974 | Japan |
| 48-60072 | 8/1973 | Japan |

OTHER PUBLICATIONS

Chemical Abstracts, vol. 82, 21298m, "Purification of Methyl Bromide Fume-Containing Waste Gas."
Chemical Abstracts, vol. 80, 6585t, "Treatment of Waste Gas from Fumigation."

*Primary Examiner*—Winston A. Douglas
*Assistant Examiner*—William G. Wright

[57] ABSTRACT

The method for desorbing and removing methyl bromide contained in active carbon adsorbent comprises contacting an organic solvent vapor which is inert to the methyl bromide, either singly or in combination with water vapor or with an inert gas, with the active carbon on which the methyl bromide is adsorbed, at a temperature such that the solvent vapor or vapor admixture can exist only in a non-condensed state.

7 Claims, No Drawings

METHOD FOR DESORPTION OF METHYL BROMIDE

FIELD OF THE INVENTION:

This invention relates to a method for the desorption and removal of methyl bromide adsorbate from active carbon adsorbents.

DISCUSSION OF THE PRIOR ART

Large quantities of methyl bromide are being employed as fumigant for soils, wood, grains and other cereals and the like for insecticidal and germicidal purposes. In recent years, however, air pollution due to industrial waste gases has often presented serious problems and accordingly attempts have been made to have the methyl bromide which is contained in the fumigation waste gases adsorbed on active carbon and then the waste gases thus treated have been released to the atmosphere after their conversion into harmless substances.

In order to economically and efficiently carry out the waste gas treatment by using active carbon, it is necessary to regenerate and reuse the active carbon employed in the above-mentioned treatment. Various regeneration methods are known in the art including, among others, the use of water vapor, the use of high-temperature heated air the use of vacuum desorption procedures, the use of elution by means of an organic solvent, and the like. The use of water vapor is however disadvantageous, when applied to the regeneration of active carbon containing methyl bromide, in that the desorption does not always take place in a satisfactory manner and the methyl bromide is susceptible to hydrolysis when treated with high-temperature water vapor. When using high-temperature heated air one faces the disadvantage that active carbon is lost due to air oxidation. To avoid this, there has been proposed an improved method (Japanese Pat. No. 22683/1974) wherein a nitrogen gas is employed instead of air. In this case, however, it is difficult to recover methyl bromide from a high-temperature effluent gas which is fed from a regeneration tower, there being the inherent danger of causing a secondary environmental pollution.

The vacuum desorption method is not suitable for the desorption of methyl bromide since the desorption hardly take place in this case.

Recently, there has been proposed a method (Japanese Pat. No. 60072/1973) for removing methyl bromide from an adsorbent, on which methyl bromide is adsorbed, by washing the adsorbent with a polar solvent capable of dissolving methyl bromide. In this method, the regeneration of the adsorbent involves two operations of washing or desorption and drying. In the washing operation, an adsorbent-packed tower must be maintained at a temperature as low as or lower than normal temperature so as to keep the methyl bromide completely in the liquid state, since the boiling point of methyl bromide is as low as 4.6° C. While, in the drying operation, it is required to heat the adsorbent-packed tower to a temperature greater than the boiling point of the polar solvent, so as to desorb or remove the polar solvent from the active carbon wetted with the polar solvent. In actual operations wherein the adsorption and regeneration are repeatedly carried out, however, it is very difficult to cool the packed tower down to lower than normal temperature when the desorption operation is effected.

BRIEF SUMMARY OF THE INVENTION

I have made an intensive study of a method for the desorption and removal of methyl bromide from active carbon and I have found an excellent desorption method which overcomes the above-mentioned prior-art disadvantages, as I will describe more fully hereinafter.

According to the present invention, the method for the desorption of methyl bromide is characterized by the steps of feeding the vapor of an organic solvent which is inactive or inert to methyl bromide, either singly or in combination with water vapor or with an inert gas, to the active carbon on which the methyl bromide is adsorbed. The feeding is effected at such a temperature that the vapor or vapor mixture can exist in a non-condensed state. The desorption method of the present invention is advantageous in that the desorption is feasible at much lower temperatures and within a shorter period of time as compared with the afore-mentioned known method of using only a high temperature nitrogen gas.

DETAILED DESCRIPTION OF THE EMBODIMENTS OF THE INVENTION

Examples of organic solvents which are inert to methyl bromide are aliphatic alcohols, such as methyl alcohol, ethyl alcohol, isopropyl alcohol and the like, and chloroform, Methyl alcohol is most preferable since it is available on the market at low cost, has a low boiling point, and is excellent in desorptive power for methyl bromide. The organic solvent may be used either singly after vaporization thereof, or in admixture with water vapor or with an inert gas. The vapor mixture can be easily obtained by introducing an inert gas such as nitrogen into a vaporizer containing the organic solvent. The proportion of methyl alcohol to inert gas in the vapor mixture may be arbitrarily varied by controlling the liquid temperature of the vaporizer. The choice of whether the organic solvent is used alone or in combination with, for example, a nitrogen gas depends on how to recover the methyl bromide after the regeneration of the active carbon. For example, methyl bromide which is desorbed in accordance with the method of the present invention is recovered by cooling the methyl bromide-containing vapor, which is withdrawn form a regeneration tower, thereby condensing a mixture of methyl bromide and organic solvent, and then separating the methyl bromide from the condensate. In this regeneration and recovery system, the desorption of the methyl bromide is made easier with a higher concentration of the organic solvent in the vapor mixture. However, a higher concentration undesirably involves the reduction in concentration of the methyl bromide in the resultant condensate and the increase in quantity of the heat to be removed in a condenser due to the increase of the organic solvent condensed. On the other hand, though the use of an organic solvent in lower concentration in the vapor mixture is advantageous since the concentration of the methyl bromide in the resultant condensate is increased, it is unfavorably required to lower the cooling temperature of the condenser. Experiments conducted by me reveal that concentrations of the organic solvent in the vapor mixture greater than 10 Volume % are effective in lowering the desorption temperature and in shortening the desorption time. A preferred concentration is one which is greater than about 30 Volume percent.

An inert gas most suitable for the purpose of the present invention is a nitrogen gas, although the invention is not limited to nitrogen. In the method of the present invention, the desorption operation is effected at a relatively low temperature, that is, slightly hgiher than the boiling point of the organic solvent used, e.g., at a temperature of 70° – 130° C. Consequently, the active carbon being treated is not lost during the operation. In addition, a flue gas or air may be used as the inert gas, because of the low operation temperature employed. With the latter, however, particular attention should be paid to avoiding the formation of a composition which is explosive.

By the same token, water vapor may be used in a mixture with the orgainic solvent vapor. In this case, the desorption operation is preferably carried out at a temperature below about 100° C, in order to avoid hydrolysis of methyl bromide. When the vapor which is withdrawn from a regeneration tower is cooled, the water vapor is also condensed along with the methyl bromide and the organic solvent, and thus a complex treatment is subsequently rendered necessary. Additionally, active carbon is wetted with water during the desorption operation and thus its drying is more difficult than in the case where an inert gas is employed.

In operation, the vapor of the organic solvent, alone or mixed with water vapor or with an inert gas, is heated to a temperature greater than 60° C, preferably greater than 80° C, and is then contacted for desorption with the active carbon. It is important that the operating temperature be kept so as not to cause the condensation of the organic solvent vapor of the vapor mixture, i.e., the desorption operation is generally effected at a temperature of 70 – 130° C. In general, it is necessary to supply from the outside a quantity of heat corresponding to the heat of desorption. In the method of the present invention, however, the adsorption of the organic solvent takes place simultaneously with the desorption of the methyl bromide, with release of the heat of adsorption, so that it is unnecessary to supply heat from the outside to the system.

The method of the present invention is extremely advantageous over the prior art methods, in that since the desorption is carried out at relatively low temperatures, the method can be put into practice with ease, economically and yet without such troubles as ignition losses of active carbon or decomposition of the methyl bromide, which would otherwise take place when a highly heated gas or water vapor are employed. Furthermore, the efficiency of desorption by the present method is high and the rate of desorption is exceedingly higher than that attained by using an inert gas alone, although the desorption operation of the present invention involves low temperatures.

The effluent gas from the desorption step is then cooled to liquefy the organic solvent which contains therein about 10 – 20% by weight of methyl bromide. The thus liquefied or condensed solution is separated by distillation into the methyl bromide and the organic solvent. The recovery percentage of the methyl bromide is generally greater than about 97%.

The inert gas which has not been condensed by cooling is recycled to the next desorption operation. Thus, the method of the present invention is applicable to a closed system, there being no possibility to cause secondary environmental pollutions.

The active carbon from which methyl bromide is desorbed adsorbs thereon the organic solvent used for desorption and, therefore, may be regenerated by drying and used in a subsequent cycle by suitable treatment such as by heating or treating with hot air.

The organic solvent recovered from the condensate may be recirculated to the next desorption operation or it may be purified for other applications. When methyl alcohol is employed as the organic solvent, the same may be advantageously utilized as a starting material for the preparation of methyl bromide without further purification.

The present invention will be now particularly illustrated in the following examples:

EXAMPLE 1

13.09 g of granular active carbon with particle size capable of passing a 14 – 30 mesh screen and containing 9.5 wt % of methyl bromide adsorbed thereon, was packed in a glass column with an I.D. of 20 mm.

Dry nitrogen was passed in 40° C methanol at a rate of 1.5 Nl/min. and then the vapor mixture thus obtained was heated to 80° C by means of a heater and fed to the desorption column. The gas withdrawn from the column was sampled at one minute intervals to determine the concentration of the methyl bromide in the gas.

Feeding was continued for 10 min, during which all of the gas exited from the column was passed to a dry ice trap to determine the quantity of the collected liquid and the concentration of the methyl bromide in it. The recovery percentage of methyl bromide was calculated from the above determinations.

For comparative purpose, an identical amount of the same active carbon on which methyl bromide was adsorbed was packed in the same glass column and a 80° C dry nitrogen gas stream was passed therethrough at a rate of 1.5 Nl/min.

The comparative test results are shown in the following Table.

Table

|  |  | Example of Invention | Comparative Example |
|---|---|---|---|
| Concentration of methyl bromide at column exit (Mol %) | Time Elapsed (Min) | Methyl Bromide Concentration (%) | |
|  | 1 | 11.40 | 4.60 |
|  | 2 | 6.16 | 5.10 |
|  | 3 | 1.15 | 3.57 |
|  | 4 | 0.36 | 1.77 |
|  | 5 | 0.13 | 0.87 |
|  | 6 | 0.043 | 0.53 |
|  | 7 | 0.021 | 0.34 |
|  | 8 | 0.010 | 0.23 |
|  | 9 | Trace | 0.17 |
|  | 10 | " | 0.13 |
| Amount of liquid collected (g) |  | 8.521 | 1.01 |
| Concentration of methyl bromide in collected liquid (wt %) |  | 14.2 | 100 |
| Recovery percentage of methyl bromide (%) |  | 97.6 | 81.4 |

EXAMPLE 2

Example 1 was repeated without using dry nitrogen. In this case, only methyl alcohol vapor vaporized in a round bottom flask at 65° C was used for the desorption. Similarly good results were obtained.

EXAMPLE 3

Example 2 was repeated except that ethyl alcohol was used instead of methyl alcohol with similarly good results. In this example, however, the ethyl alcohol, vaporized at 80° C, was further heated to about 95° C and passed into the active carbon-packed column.

What I claim and wish to secure by Letters Patent of the United States is:

1. A method for the desorption of methyl bromide contained on active carbon adsorbent, which comprises the step of contacting an organic solvent vapor which is inert to but desorbs methyl bromide and is selected from the group consisting of lower aliphatic alcohols and chlorinated methane derivations, with the active carbon at a temperature of from about 60° C to about 130° C.

2. The method according to claim 1, wherein said organic solvent vapor is admixed with water vapor and said temperature is between 60° and 100° C.

3. The method according to claim 1, wherein said organic solvent vapor is admixed with an inert gas which is selected from the group consisting of nitrogen, flue gas and air.

4. The method according to claim 1 wherein said organic solvent vapor is methyl alcohol and said temperature is between 80° and 130—° C.

5. The method according to claim 1 wherein said organic solvent vapor is methyl alcohol admixed with water vapor and said temperature is between 80° and 100° C.

6. The method according to claim 1 wherein said organic solvent vapor is a mixture of methyl alcohol and nitrogen gas, the methyl alcohol being present in an amount greater than 10% by volume.

7. The method according to claim 6 wherein said vapor of methyl alcohol is present in an amount greater than 30 Vol. %.

* * * * *